United States Patent
Calvignac et al.

(10) Patent No.: US 7,085,850 B2
(45) Date of Patent: Aug. 1, 2006

(54) STATELESS MESSAGE PROCESSING SCHEME FOR NETWORK PROCESSORS INTERACTIONS

(75) Inventors: Jean Louis Calvignac, Cary, NC (US); Mohammad Peyravian, Morrisville, NC (US); Fabrice Jean Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 772 days.

(21) Appl. No.: 09/934,886

(22) Filed: Aug. 22, 2001

(65) Prior Publication Data

US 2003/0041172 A1 Feb. 27, 2003

(51) Int. Cl.
G06F 15/16 (2006.01)

(52) U.S. Cl. ............ 709/246; 709/245; 709/230; 709/236; 709/248; 709/205; 712/201; 712/220; 712/34; 712/35; 370/394; 370/412; 370/389

(58) Field of Classification Search ............ 709/246, 709/205, 230, 236, 248, 245; 712/201, 220, 712/34, 35; 370/394, 412, 389
See application file for complete search history.

(56) References Cited

U.S. PATENT DOCUMENTS

| | | | | |
|---|---|---|---|---|
| 4,991,133 A | * | 2/1991 | Davis et al. ............... | 709/234 |
| 5,619,497 A | * | 4/1997 | Gallagher et al. .......... | 370/394 |
| 5,991,299 A | * | 11/1999 | Radogna et al. ............ | 370/392 |
| 6,317,837 B1 | * | 11/2001 | Kenworthy .................. | 726/11 |
| 6,408,001 B1 | * | 6/2002 | Chuah et al. ................ | 370/392 |
| 6,434,620 B1 | * | 8/2002 | Boucher et al. ............ | 709/230 |
| 6,496,704 B1 | * | 12/2002 | Yuan .......................... | 455/466 |
| 6,498,793 B1 | * | 12/2002 | Haviland .................... | 370/394 |
| 6,661,794 B1 | * | 12/2003 | Wolrich et al. ............. | 370/394 |
| 6,687,757 B1 | * | 2/2004 | Ben-Ze'ev et al. ......... | 709/250 |
| 6,757,725 B1 | * | 6/2004 | Frantz et al. ............... | 709/223 |
| 6,789,147 B1 | * | 9/2004 | Kessler et al. ............. | 710/200 |

* cited by examiner

Primary Examiner—Saleh Najjar
Assistant Examiner—Shawki Ismail
(74) Attorney, Agent, or Firm—Joscelyn G. Cockburn; William N. Hogg

(57) ABSTRACT

A stateless message-passing scheme for interactions between a network processor and a coprocessor is provided. The network processor, when receiving data frames for transmission from a network element to another network element encapsulates the entire packet that it receives within a frame. In this frame, there is provided a header field and a data field. The data field contains the data that needs to be transferred, and the header field contains all of the information regarding the deep-processing that the coprocessor is to perform so that no information of any type need be stored either by the network processor or separately regarding the processing of the data in the data packet. The coprocessor performs the operation designated by the header and returns the altered packet and header to the network processor.

12 Claims, 2 Drawing Sheets

FIG. 2

| Header | | | | | | |
|---|---|---|---|---|---|---|
| Version | In/Out Frame | Frame Length | Encryption Algorithm | | | Hash Algorithm |
| Compression Algorithm | Special Function | Option Present | Reserved | | | |
| Encryption Key Length (opt) | | | Encryption Key Value (var) | | | |
| Encryption Mode Parameter Length (opt) | | | Encryption Mode Parameter Value (var) | | | |
| Hash Key Length (opt) | | | Hash Key Value (var) | | | |
| Compression Algorithm Parameter Length (opt) | | | Compression Algorithm Parameter Value (var) | | | |
| Application-Defined Header Length (opt) | | | Application-Defined Header Value (var) | | | |
| Data Length (opt) | | | Data Value (var) | | | |
| Data | | | | | | |

STATELESS MESSAGE PROCESSING SCHEME FOR NETWORK PROCESSORS INTERACTIONS

BACKGROUND OF THE INVENTION

In various network schemes, such as the internet, network processors offer real time processing of message packets and packet forwarding from a received location to a delivered location. As internet or other network traffic increases, deep-packet processing functions (such as packet compression, encryption, filtering, classification, hashing, etc.) are moving from the server to the network edge. As this happens, at the network edge there is a greater demand for high-throughput (e.g., 10 Gigabits per second {Gbps} or higher) deep-packet processing function. Given that the deep-packet processing functions (e.g. encryption, compression, hashing, etc.) require many operations on the data in the packet, the network processor becomes overloaded and not able to perform these deep-packet processing functions efficiently at the high-throughput rate. Therefore, it becomes desirable and, in some cases, even necessary to maintain the high-throughput rate to perform these special, intensive deep-packet processing functions to consider using a coprocessor linked to a network processor. However, at these high-throughput rates, it is increasingly inefficient to attempt to maintain packet information and states regarding exchanges between a network processor and a coprocessor. One of the reasons for this is the requirement to maintain sufficiently large buffers and state retrieval algorithm with regard to each of the packets transferred between the coprocessor and the network processor. Hence, the benefit of the coprocessor and network processor being able to perform the required deep-packet processing functions is significantly impacted by the increasing inefficiency of maintaining packet information and states.

SUMMARY OF THE INVENTION

According to the present invention, a stateless message-passing scheme for interactions between a network processor and a coprocessor is provided. According to this scheme, the network processor, when receiving data frames for transmission from a network element to another network element, encapsulates the entire packet that it receives within a frame. In this frame, there is provided a header field and a data field. The data field contains the data that needs to be transferred, and the header field contains all of the information regarding the deep-processing that the coprocessor is to perform so that no information of any type need be stored either by the network processor or separately regarding the processing of the data in the data packet. By way of example and just as an example not as a limitation, the header may include the frame length, any encryption algorithm if encryption is to be performed, any hash algorithm if hashing is to be performed, any compression algorithm if compression is to be performed, any special functions, any options present, any encryption key length, any encryption key value and encryption mode parameter length, encryption mode parameter value, hash key length, hash key value, any compression algorithm parameter lengths, any compression algorithm parameter values, any application-defined header length, application-defined header value and data length and data value. The header also indicates whether the packet is being passed to the coprocessor for packet processing or whether it is being passed from the coprocessor to the network processor after having had the processing functions performed. Also, in one version of the present invention, if the sequence of passing of the data is important, then all data frames are passed from the network processor to the coprocessor whether or not the coprocessor is to perform any processing function thereon. Thus, the only buffer that is needed is a FIFO buffer to maintain the sequence of the packets.

DESCRIPTION OF THE DRAWINGS

FIG. 2 is a depiction of a data frame with various header fields that could be used according to the present invention.

DESCRIPTION OF THE PREFERRED EMBODIMENT

Figure 1:
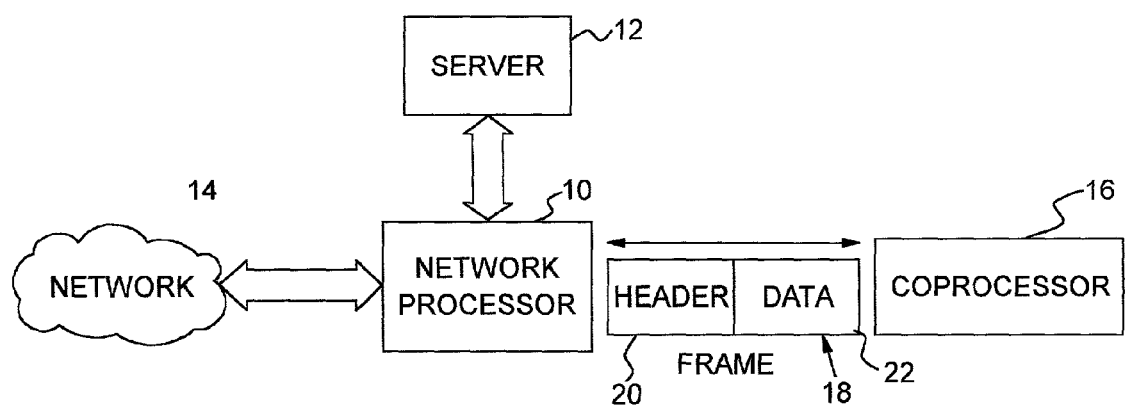
FIG. 1 is a high level depiction of the present invention in the context of a network, a network processor, a server and a coprocessor.

Referring now to the drawings and, for the present to FIG. 1, a very high level schematic drawing shows the interaction between a network processor 10, a server 12, a network 14 (such as an internet), and a coprocessor 16, wherein the network processor 10 and coprocessor 16 can pass frames of information 18 back and forth. The frames 18 are comprised of a header section 20 and a data section 22. The frames 18 can be passed back and forth between the network processor 10 and server 12 on the network 14.

The invention will be first described as network processor 10 receiving packets of information from the server 12. When the packets of information are received from the server 12, they are encapsulated within a frame 18. Often, the packet of information received requires various processing to be performed on the data, and the present invention provides for the network processor having programming to generate a header section 20 which contains all of the information necessary for a coprocessor to process the data in the data field 22 according to predetermined protocol, thus obviating the need for maintaining a separate buffer for each data packet to be stored defining whatever processing is taking place, e.g. encryption, compression, hashing, etc. The information included in header 20 can be implemented in any of several different ways. For example, a policy for creating the information can be included in the network processor. The policy would include considering its source and destination of the message packet. Alternatively, the message packet itself could include the necessary information from which the network processor 10 can decide what information to include in the header 20, or some combination of the two can be used. The frame 18 is passed from the network processor 10 to the coprocessor 16 for whatever specified operations need to be performed on the data. The coprocessor 16 contains programming that "reads" the header 20 and performs the necessary operation(s), makes whatever changes are necessary in the header 20 as a result of the operation performed, and returns the processed frame 18 to the processor 10 for whatever further function(s), such as transmission, is required. Thus, no record of the operation or other data need to be maintained either by the processor or independently. The processed frame is then transmitted to the server 12 on network 14.

FIG. 2 shows various fields within the header 22 which may be provided to constitute the frame a "stateless". It is to be understood that, depending upon the nature of the network and the overall requirements of the network, all of these fields in the frame header 22 need not be supplied. Moreover, if additional processing is needed, additional fields can be supplied to the header 20. The ones shown in FIG. 2 are illustrious of various functions that typically are or may be performed in some networks and, thus, the following fields are typical, not exclusive, nor, as indicated above, do some networks need all of them to be present depending upon the nature of the processing which may be performed on any packet of data. These operations and the header information are determined as indicated above. One field is the Version field which indicates the protocol Version used for exchange between processor 10 and coprocessor 16. An In/Out field is provided which indicates whether the frame is coming from the network processor 10 to the coprocessor 16 or from the coprocessor 16 to the network processor 10. Since the frame 18 is sent from the network processor to the coprocessor to have various operations performed, and once these operations have been performed on the data, the frame is returned to the network processor and the network processor must "know" whether or not the operation(s) have been performed, and this would be indicated by whether the frame is going from the network processor 10 to the coprocessor 16 or from the coprocessor 16 to the network processor 10. A Frame Length field is provided which indicates the length of the frame. The network processor 10 will provide the length of the frame 18 going to the coprocessor 16. If, as a result of the coprocessor's operation on the data the frame length changes, then the coprocessor 16 will change this length in the Frame Length field on the return of the frame 18 from the coprocessor 16 to the network processor 10. An Encryption Algorithm field is provided which indicates which algorithm (if any) to use to encrypt the data in field 22. Various encryption algorithms include DES, TripleDES and AES, among others. A Hash Algorithm field is provided which indicates which hash algorithm should be used, such as for example, MD5, SHA-1, or such other algorithms as may be selected. A Compression Algorithm field is provided which indicates what compression algorithm (if any) to use to compress the data. A particularly useful data compression algorithm is LZS, although others can be used. A Special Function field indicates if any special needs are to be met in the performance of the functions by the coprocessor. For example, it may be required to first compress, then encrypt, which would be contained in the Special Function field. An Option Present field is a field which will indicate which fields are present in the header 20 of any particular frame 18 so that the coprocessor 16 "knows" what fields to look in for processing information, and the network processor 10 also "knows" which field to look in for any frames 18 received back from the coprocessor 16. The Reserve Field is a field which can be used for any other functions or uses which are not taken care of in the normal fields and, thus, allows a certain expandability of the header function for any particular network processor/coprocessor relationship. The Encryption Length field is a field which can indicate the length of the encryption key and an Encryption Key Value field contains the encryption/decryption key to be used (if any). An Encryption Mode Parameter Length is a field which may be provided to indicate the length of the encryption mode parameter. The Encryption Mode Parameter Value field is a field which will indicate which particular mode parameter is to be used, such as CBC, ECB or others. A Hash Key Length field is provided which will indicate the length of the hash key, and a Hash Key Value field contains a hash key (if any) for the key to the hash operation. A Compression Algorithm Parameter Length field is provided, as well as a Compression Algorithm Parameter Value field which contains the compression algorithm parameter (if any). An Application-Defined Header Value is a field which is ignored by the coprocessor when included in the in-frame and sent back unmodified in the out-frame. This field is provided to carry any information that the network processor may choose to put in it. For example, in the case of internet protocol packets, it may carry the header of an internet protocol packet. A Data Length field is provided which indicates the length of the data in the data field 22.

With the header 20 containing all of the information necessary for the coprocessor to act upon the data, it is unnecessary for the network processor to track either internally or in a separate storage facility the information to identify not only the processing functions to be performed but also the frame to which they attach, and whether or not they have been performed. Thus, when the network processor 10 receives a data packet 14, it need merely fill in all of the information needed in the various fields of the header 20 and send the completed frame 18 with the header 20 and the data 22 to the coprocessor 16 for the coprocessor to perform whatever operations need to be performed. As indicated above, the in/out frame is flagged to indicate that the data is going into the coprocessor. The coprocessor then performs the operation designated by the information in the header 20, and modifies the header 20 as required. When the coprocessor 16 has performed all of the required operations and filled in all of the values in the header that may have changed as a result of the various operations, the frame 18 is passed back to the network processor 10 with the In/Out frame having been changed to flag that the frame has come out of the coprocessor 16 so the network processor 10 knows that it can pass it on, for example to the network 14.

In some protocols, for example certain internet protocols, it is necessary that the packets be delivered in the order in which they were received by the network processing elements, such as the network processor 10. In a stream of packets (with the same source and destination addresses) it might be the case that some packets require operations that need to be done by the coprocessor 16 and some that do not require coprocessor assistance. In this scenario, all such packets, i.e. the ones with the same source and destination, addresses, are sent to the coprocessor 16 in the order in which they are received by the network processor 10 and are returned form the coprocessor 16 in the order in which the coprocessor 16 receives them. When it is not required for the coprocessor to perform any processing on the frame 18, a no-op flag in the Special Function field is actuated, which indicates to the coprocessor 16 that it need merely return the particular frame with its no-op instruction to the network processor 10 in the same order that it was received by the coprocessor 16 without performing any function. Thus, even in the case where order preservation is necessary, a separate listing or record of this order need not be kept since this can be handled by a required interchange between the network processor 10 and the coprocessor 16, such as by using FIFO buffers.

The coprocessor 16 can also be used to "deprocess" information or return the data to its original state, which has been encrypted or compressed or hashed. For example, if the network processor 10 receives a frame 18 from the network 14 which has processed information thereon, and the network processor 10 wishes to convey the original information to the server 12, the frame 18 can be sent to the coprocessor 16, and the reverse functions of the compression or encryption or hashing can be performed, and the frame returned to the network processor 10 and then delivered to the server 12.

Thus, with the present invention, a network processor and coprocessor operating in conjunction with each other can effectively and quickly process high-throughput (e.g., 10 Gbps or higher) deep-packet processing functions efficiently and effectively without the need for keeping any records or storage of any information regarding the processing that takes place on the packet and can even provide the necessary ordering of the packets through the system, thus being stateless.

Accordingly, the preferred embodiment of the present invention has been described. With the foregoing description in mind, however, it is understood that this description is made only by way of example, that the invention is not limited to the particular embodiments described herein, and that various rearrangements, modifications, and substitutions may be implemented without departing from the true spirit of the invention as hereinafter claimed.

What is claimed is:

1. A method of operating a network for transmission of data between users, and wherein said network includes at least one network processor and at least one coprocessor associated with said network processor, and wherein said data is passed to said network processor in data packets, said method comprising:

each of said network processors encapsulating the data in each packet into a data frame before transmission on the network, and wherein said network processor provides a header for the data in each data frame which includes all the information necessary to direct the coprocessor to perform all required operations on said data passing at least some data frames, including the header thereof, from said network processor to said coprocessor associated therewith before transmission on the network, performing any operations required by the header in said coprocessor on said data before transmission on the network, modifying said header information by said coprocessor after performing said required operations, returning said data frame from said coprocessor to said network processor with said modified header, and thereafter transmitting said data with said modified heading on said network.

2. The method as defined in claim 1 wherein all data frames with said created headers are sent to the coprocessor associated with said network processor and said coprocessor returns said data in the order it was received from the network processor.

3. The method as defined in claim 1 wherein said network processor can receive data with the modified data header, passing said received data with the modified header to said coprocessor associated therewith, restoring the data from its modified form to its original form in the coprocessor and returning said stored data to the network processor.

4. The method as defined in claim 3 wherein there is at least two network processors on said network and each of said processors is configured to pass data with created headers therebetween.

5. The method as defined in claim 2 wherein the information for generating said header is contained, at least in part, in said network processor.

6. The method as defined in claim 3 wherein the information for generating said header is contained, at least in part, in said data packets (col. 12, lines 45–57).

7. A system for transmission of data between users comprising:

a network processor and at least one coprocessor associated with said network processor, said data being passed to said network processor in data packets, each of said network processors including programming which encapsulates the data in each packet into a data frame before transmission on the network, including a header for the data in each data frame, which header includes all the information necessary to direct the coprocessor to perform all required operations on said data and to pass at least some data frames, including the header thereof, from said network processor to said coprocessor associated, programming in said coprocessor to read and perform any operation required by the header on said data before transmission on the network, programming in said coprocessor to modify said header information after performing said required operations on the data and to return said data frame from said coprocessor to said network processor with said modified header, Thereafter transmitting said data with said modified heading on said network.

8. The system as defined in claim 7 wherein said programming in said network processor will send all data frames with said created headers to the coprocessor associated with said network processor, and said programming in said coprocessor will return said data frames in the order they were received from the network processor.

9. The system as defined in claim 7 wherein said programming in the network processor can receive data with the modified data header, pass said received data with the modified header to said coprocessor associated therewith, and said programming in said coprocessor can restore the data from its modified form to its original form in the coprocessor and return said restored data to the network processor.

10. The system as defined in claim 7 wherein there is at least two network processors and each of said processors is configured to pass data with created headers therebetween.

11. The system as defined in claim 7 wherein the information for generating said header is contained, at least in part, in said network processor.

12. The system as defined in claim 7 wherein the information for generating said header is contained, at least in part, in said data packets.

* * * * *